M. MALEK.
ANTISKID DEVICE FOR MOTOR VEHICLE WHEELS.
APPLICATION FILED NOV. 18, 1913.
1,095,219.
Patented May 5, 1914.
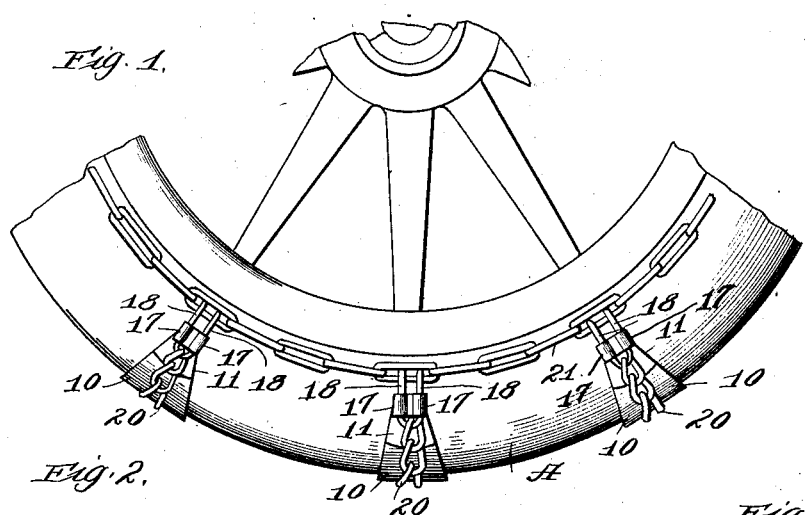
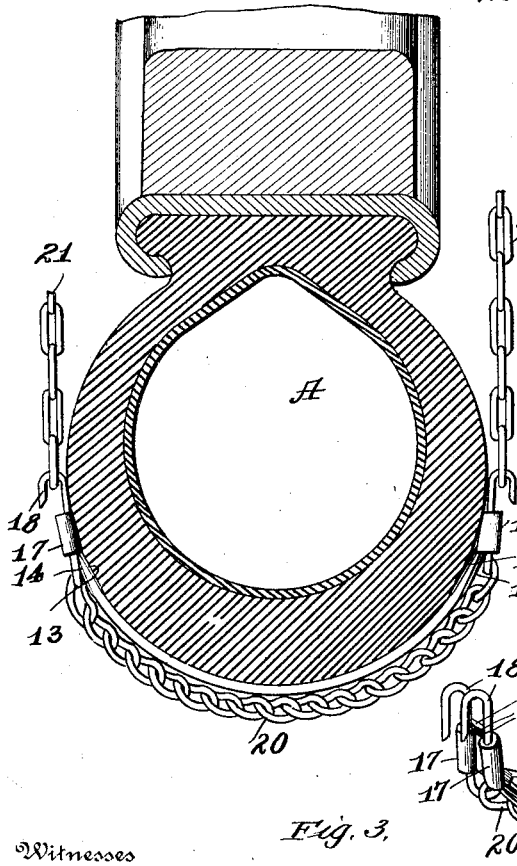
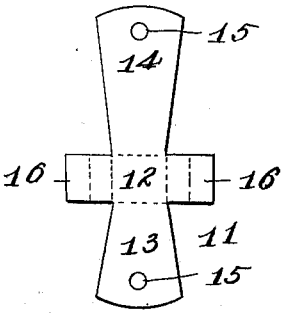
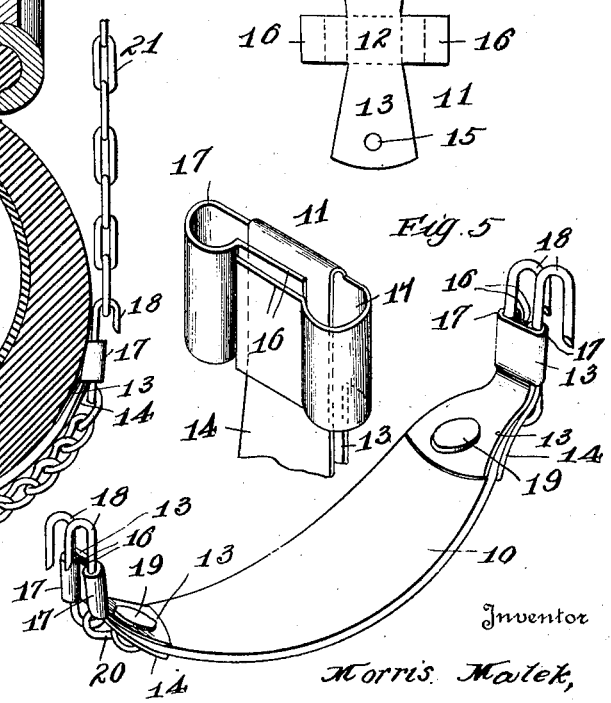
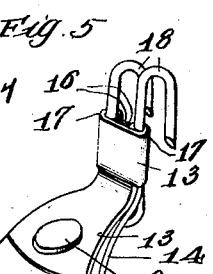
Inventor
Morris Malek,
Witnesses
By A. M. Wilson
Attorney

UNITED STATES PATENT OFFICE.

MORRIS MALEK, OF NEW YORK, N. Y.

ANTISKID DEVICE FOR MOTOR-VEHICLE WHEELS.

1,095,219. Specification of Letters Patent. Patented May 5, 1914.

Application filed November 18, 1913. Serial No. 801,576.

*To all whom it may concern:*

Be it known that I, MORRIS MALEK, a subject of the King of Hungary, residing at New York, in the county of New York and State of New York, have invented certain new and useful Improvements in Antiskid Devices for Motor-Vehicle Wheels, of which the following is a specification.

This invention relates to certain new and useful improvements in anti-skid devices for motor vehicle wheels.

An object of this invention is to provide an anti-skid attachment for the usual form of motor vehicle wheel now in use and which may be readily attached thereto and detached therefrom should the same become broken, worn or otherwise injured.

A further object of the invention is to provide an anti-skid device for cushion wheels which will materially increase the tractive properties thereof and prevent the same from undue skidding movement.

A further object of the invention is to provide a device simple in construction, inexpensive to manufacture and which possesses all of the advantages hereafter claimed.

With the above and other objects in view, the invention will be more specifically described in detail and then claimed, reference being had to the accompanying drawings by like characters throughout the several views and wherein:—

Figure 1 is a side elevational view of a portion of a wheel with my invention attached thereto. Fig. 2 is a cross sectional view of the same. Fig. 3 is a perspective view of my anti-skid device. Fig. 4 is a developed plan view of the metallic end clip, and Fig. 5 is an enlarged perspective view partly broken away and partly folded of the metallic end clip.

Referring more specifically to the drawing, the reference letter A represents a pneumatic tire of usual construction. While I have shown the device applied to a pneumatic tire, I do not wish to confine myself thereto as the same can be applied to a cushion tire as well, or in fact any other form of wheel and still perform the functions claimed for the same.

The anti-skid device comprises a strip 10 of any material and of oval shape, but it is preferably desired that this material be of heavy leather or raw-hide. Each end of this strip 10 is provided with a metallic clip generally designated 11. A developed plan view of this clip previous to the folded position which the same is caused to assume is shown in Fig. 4 and the clip comprises a flat plate 12 provided with two lengthwise segment-shaped extensions 13 and 14 each of which is provided with an opening 15 for the reception of a rivet or other suitable fastening means which passes through the strip 10 when the clip is caused to be folded. Extending laterally from the plate 12 is a pair of opposed ears 16 adapted to be folded to, provide passageways or openings 17 for the reception of a substantially U-shaped hook member 18.

Fig. 5 shows the end clip partially folded to better illustrate the manner of folding the same and an important feature of my invention. The extension 14 of the plate 12 is folded over the same and lies in a position opposite the extension 13. When the extensions 13 and 14 have been so folded the ears 16 are folded inwardly to assume the position above described and have their ends soldered or otherwise secured to each other and to the extension 14 at the point of meeting. Previous to bending the ears 16 the hook 18 is placed in position and the ears bent therearound and secured as above described. The end clip is then attached to the strip 10 by receiving the end of the strip between the extensions 13 and 14 and held in such position by a rivet 19 or any other suitable fastening means. It is of course understood that the hook 18 is permitted to freely slide through the ears 16.

An anti-skid chain is connected at its ends to the closed ends of the U-shaped hooks 18 and bears upon the outer face of the strip 10. Chains 21 are disposed circumferentially of the sides of the tire and are adapted to receive the ends of the hooks 18.

It is believed that the operation of the device will be readily apparent from the above description and that it will be apparent that the width of the strip 10 will act as a shield for the tire A, while the chain carried by said strip will effectually prevent a skidding movement. It is also evident that although the end clips are of extremely simple construction and comprise few parts, that the stability and strength of the same will carry the device for unlimited periods.

While I have shown and described the preferred embodiment of my invention, I do not wish to confine myself thereto, as various forms and modifications and arrangements of the parts may be had without departing from the spirit and scope of the invention as claimed.

I claim:—

In an anti-skid device for vehicle wheels, a shield, metallic clips inclosing the ends of said shield, each clip formed from a blank having end extensions folded to constitute the shield inclosing portions, lateral extensions carried by the blank folded to provide tubular members, hooks slidingly-mounted in said tubular members, and a chain disposed outwardly of the shield and connected at its ends to the inner ends of said hooks.

In testimony whereof I affix my signature in presence of two witnesses.

MORRIS MALEK.

Witnesses:
 HERMANN REICH,
 EMIL GUTTMANN.